Patented Sept. 1, 1942

2,294,756

UNITED STATES PATENT OFFICE 2,294,756

METHOD OF MANUFACTURING ELECTRICAL RESISTORS HAVING NEGATIVE TEMPERATURE CHARACTERISTICS

Hideo Inutsuka and Shujiro Kawase, Kawasaki, Kanagawa-ken, Japan, assignors to General Electric Company, a corporation of New York No Drawing. Application January 14, 1941, Serial No. 374,356. In Japan February 7, 1940

3 Claims. (Cl. 201—76)

The present invention relates to a method of manufacturing resistances having a negative temperature characteristic. Heretofore, in manufacturing resistance of this kind it has been customary to ball mill powdered metallic oxides of two or more kinds employing a proper binder to facilitate forming or molding it into any desired form. The shaped product was then sintered at high temperatures of about 1300° C. to 1600° C. However, in sintering metallic oxides in this manner the resulting product is quite porous due to volatilization of the binder or contraction due to heating and even after aging the porosity persists and the product absorbs moisture. As a result the occluded moisture in the resistance causes great irregularity both in resistance value and in the temperature coefficient. Moreover, in cases where only metallic oxides are used the sintering temperature is extremely high and requires heating for several hours.

In accordance with the present invention, a comminuted or pulverized metallic oxide is mixed, for example in a ball mill with a comminuted or powdered metal element, then formed into a desired shape and thereafter sintered in an oxygenous atmosphere or in the presence of an oxidizing substance or medium thereby effecting the oxidation of the metal and providing a product having a negative temperature coefficient of resistance. The product formed in this manner does not have the aforesaid defects of the prior art product. In other words, by employing an elemental metallic substance it is possible to lower the sintering temperature and to shorten the sintering time. Furthermore, the porosity is reduced by increasing the volume of the product when the metallic substance is oxidized, thereby removing various disadvantages due to occluded moisture.

Various metals are adapted to be used for the metallic substance but we have obtained good results by using copper, nickel, chrome, cobalt, tungsten, molybdenum and the like. However, metals such as titanium, zirconium and uranium also may be used if desired. The metallic oxides to be mixed with the powder of said elemental metal may be the oxides of those metals or other metals.

As an example we have mixed in a ball mill and for about 20 to 30 hours, about 80% by weight of powdered copper with about 20% by weight of chrome oxide ($Cr_2O_3$). Paraffin has then been added to and mixed with the powdered material and the resulting mixture pressed and molded into a desired shape. The molded structure is then sintered in an electric furnace, heated at a temperature of 1050° C. for one to two hours in the presence of an oxygenous atmosphere or medium. The resistance produced in this manner is very satisfactory, its porosity is substantially zero and the temperature characteristic is uniform.

In another instance 60% of copper powder and 40% of chrome oxide were mixed and an equally good resistance produced by sintering the mixture for two hours at about 1200° C. In this case substantially the same result was attained by replacing a part of chrome oxide with ferric oxide ($Fe_2O_3$).

In still another instance copper powder was added to molybdenum oxide of advanced oxidation. When the mixture was sintered in an inert gas or a reducing gas the molybdenum oxide acted as an oxidizing medium and was reduced slightly at the same time the copper was oxidized resulting in the production of a good resistance.

Resistances produced in such manner may be used by providing proper terminals therein after they have undergone suitable aging if necessary. They may be formed in shapes such as bars, plates and the like. The resistances show high values at the room temperature but as the temperature rises the resistance value thereof decreases markedly.

While our invention has been described with reference to certain specific compositions, it will be understood that various other modification may readily be made within the scope of the invention.

What we claim as new and desire to secure by Letters Patent of the United States is:

1. A method of manufacturing bodies substantially free from porosity and having a negative temperature coefficient of resistance which consists in mixing a powdered oxide of a metal with one or more powdered metals shaping the mixture and then sintering the shaped mixture at a temperature above 1000° C to below 1300° C. in the presence of an oxidizing medium to thereby effect oxidation of said one or more metals.

2. The method of making a body having a negative temperature coefficient of resistance which comprises mixing a powdered oxide of a metal with one or more powdered metals, shaping the mixture and then sintering it under oxidizing conditions at a temperature of at least 1000° C. but below 1300° C. to thereby oxidize said one or more metals.

3. The method of making bodies having a negative temperature coefficient of resistance which comprises mixing about 60 to 80% copper with about 40 to 20% of an oxidized metal, pressing the mixture to a desired shape and thereafter sintering the mixture at a temperature between about 1050° C. and 1200° C.

HIDEO INUTSUKA.
SHUJIRO KAWASE.